United States Patent
Reid et al.

(10) Patent No.: US 12,482,574 B1
(45) Date of Patent: Nov. 25, 2025

(54) HEAT PIPE REACTORS WITH ARBITRARY HEAT EXCHANGERS

(71) Applicant: Triad National Security, LLC, Los Alamos, NM (US)

(72) Inventors: Robert Stowers Reid, Santa Fe, NM (US); Tana Cardenas, Santa Fe, NM (US); Patrick Ray McClure, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 287 days.

(21) Appl. No.: 17/835,247

(22) Filed: Jun. 8, 2022

Related U.S. Application Data

(62) Division of application No. 15/703,979, filed on Sep. 13, 2017, now abandoned.

(60) Provisional application No. 62/400,625, filed on Sep. 27, 2016.

(51) Int. Cl.
 *G21C 15/257* (2006.01)
 *G21C 15/18* (2006.01)

(52) U.S. Cl.
 CPC .......... *G21C 15/257* (2013.01); *G21C 15/18* (2013.01)

(58) Field of Classification Search
 CPC .................................................. G21C 15/257
 See application file for complete search history.

(56) References Cited

U.S. PATENT DOCUMENTS

| | | | | |
|---|---|---|---|---|
| 3,229,759 A | * | 1/1966 | Grover | G21C 15/02 174/15.1 |
| 3,378,449 A | | 4/1968 | Roberts et al. | |
| 3,414,050 A | * | 12/1968 | Anand | F28D 15/06 165/274 |
| 3,558,935 A | * | 1/1971 | Gritton | G21C 1/22 976/DIG. 30 |
| 3,613,773 A | * | 10/1971 | Hall | F28D 15/06 310/306 |
| 4,674,562 A | * | 6/1987 | Bassani | F28D 15/06 165/96 |
| 2007/0204975 A1 | | 9/2007 | Liu et al. | |
| 2010/0040187 A1 | | 2/2010 | Ahlfeld et al. | |
| 2013/0048249 A1 | | 2/2013 | Lin et al. | |
| 2016/0019990 A1 | | 1/2016 | Mochizuki et al. | |
| 2018/0268950 A1 | | 9/2018 | Mckellar | |

FOREIGN PATENT DOCUMENTS

WO    WO 00/11423    3/2000

OTHER PUBLICATIONS

Brennan, P. J. et al., "Heat Pipe Design Handbook," vol. II, 222 pgs, (Jun. 1979).

(Continued)

*Primary Examiner* — Sharon M Davis
(74) *Attorney, Agent, or Firm* — Alston & Bird LLP

(57) ABSTRACT

A heat pipe reactor may include a heat pipe array with a reactor core at any distance along the length of the heat pipe array. Heat exchangers may be placed on both sides of reactor core. The heat pipe array may also be attached to one or more decay or similar heat exchangers placed near one or both sides of the reactor core, allowing heat removal following shutdown.

8 Claims, 6 Drawing Sheets

(56) References Cited

OTHER PUBLICATIONS

McClure, P. R., "Very Small Reactors for Rapid Deployment (2 to 1 MWe, Mobile Heat Pipe Cooled Fast Reactor)," Los Alamos National Laboratory, 53 pgs, (2011).
Reid, R. S. et al., "Heat-Pipe Development for Advanced Energy Transport Concepts Final Report Covering the Period Jan. 1999 through Sep. 2001," Los Alamos National Laboratory, 74 pgs, (2002).

* cited by examiner

300A

300B

HEAT PIPE REACTORS WITH ARBITRARY HEAT EXCHANGERS

CROSS-REFERENCE TO RELATED APPLICATION

This application is a divisional of U.S. patent application Ser. No. 15/703,979, filed Sep. 13, 2017, which claims the benefit of U.S. Provisional Application No. 62/400,625, filed on Sep. 27, 2016. The subject matter of each of the foregoing applications is hereby incorporated herein by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to heat pipe reactors for nuclear, chemical, or any other thermally driven reactor.

BACKGROUND

Heat pipe reactors are cooled with an array of heat pipes. The array of heat pipes each have a condenser and project from one side of the reactor core. FIG. 1 illustrates related art of a conventional heat pipe reactor 100. In FIG. 1, heat pipe 102 within reactor 100 is partially filled with alkali metal, such as potassium, sodium, or lithium. Typically, heat is added to heat pipe 102 at one end 104, and transferred to a heat exchanger, which is generally on the other side 106 of heat pipe 102. In other words, heat is added to one side of heat pipe 102, and transferred to the other side of heat pipe 102. This allows a heat pipe to access an energy convertor typically through a shadow or other shield.

However, a more efficient heat pipe reactor configuration may be desirable.

SUMMARY

Certain embodiments of the present invention may provide solutions to the problems and needs in the art that have not yet been fully identified, appreciated, or solved by conventional heat pipe reactors. For example, some embodiments of the present invention pertain to one or more heat pipe reactors having evaporator and condenser power profiles including but not limited to uniform power distribution.

In an embodiment, a heat pipe reactor may include a heat pipe with a reactor core at the center of the heat pipe. Heat exchangers may be placed on both sides of reactor core. In certain embodiments, a decay heat exchanger may also be placed on one or both sides of the reactor core, transforming the decay heat exchanger into a heat exchanger to remove radioactive decay heat following reactor shut down.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to an array of parallel heat pipes used to cool a reactor core. The heat pipe array transfers heat from the reactor fuel zone (e.g., the reactor core) outward to a zone that includes one or more heat exchangers.

As discussed above, a conventional heat pipe reactor core includes an array of heat pipes that project outward from one end of the reactor core. Certain embodiments, however, may project the array of heat pipes from both ends of the heat pipe reactor core, i.e., the location where the heat pipe condensers couple to a multiplicity of heat exchangers. One or more heat exchangers may be located at one end of the reactor core and one or more heat exchangers may be situated at the other end of the reactor core. The power level transferred to either side of the reactor core is not required to be equal or symmetrical.

Projecting the array from both ends of the reactor doubles the cross-sectional area available to the heat pipe to transfer heat out. Also, the effective length that the liquid condensate travels through the heat pipe wick from the heated to cooled zones of the heat pipe is reduced. This may effectively increase the amount of power throughput from the reactor by up to a factor of four in some embodiments.

The heat exchangers may be optimized for gas, vapor, supercritical fluids, and/or liquid in certain embodiments. For example, a first heat exchanger may be optimized for vapor and a second heat exchanger may be optimized for liquid or gas. In other words, the heat exchangers are independently tunable.

Sometimes, for instance when a nuclear reactor core is shut down, there is a need to remove heat. In these instances, about 3 to 5 percent of the full power of the reactor core radioactive decay heat must be removed. With heat pipes, by placing one or more heat exchangers at the exit of the reactor core, the one or more heat exchangers may then be used as decay heat exchangers to remove radioactive decay heat. It should be appreciated that the decay heat exchangers may be placed at any point along the condensers of the heat pipe array. One or more heat exchanger may also be placed further away from the decay heat exchanger, transferring the main heat when the reactor core is operational. Alternatively, in certain circumstances, a non-decay heat exchanger can be situated between the decay heat exchanger and the reactor.

Put simply, as working fluid condenses in the condensers of the heat pipe array, head from the condensate may transit to the walls of the heat pipe array. Heat may the conduct across the wall to the one or more heat exchangers, which are attached to the condensers, for example.

Figure 1:
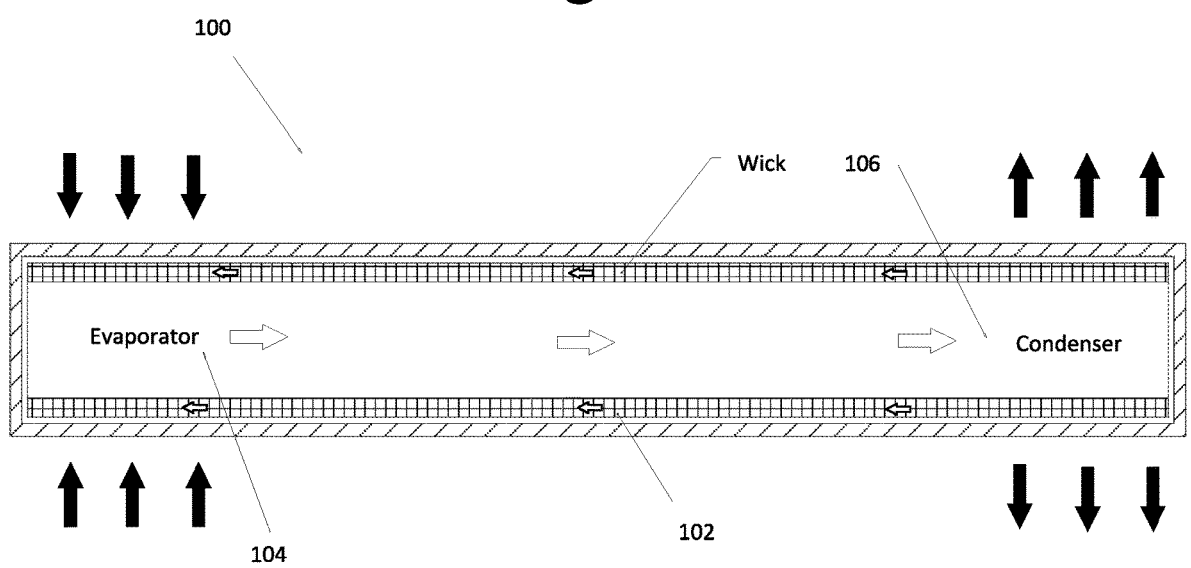
FIG. 1 is related art of a conventional heat pipe within a reactor.
Figure 2:
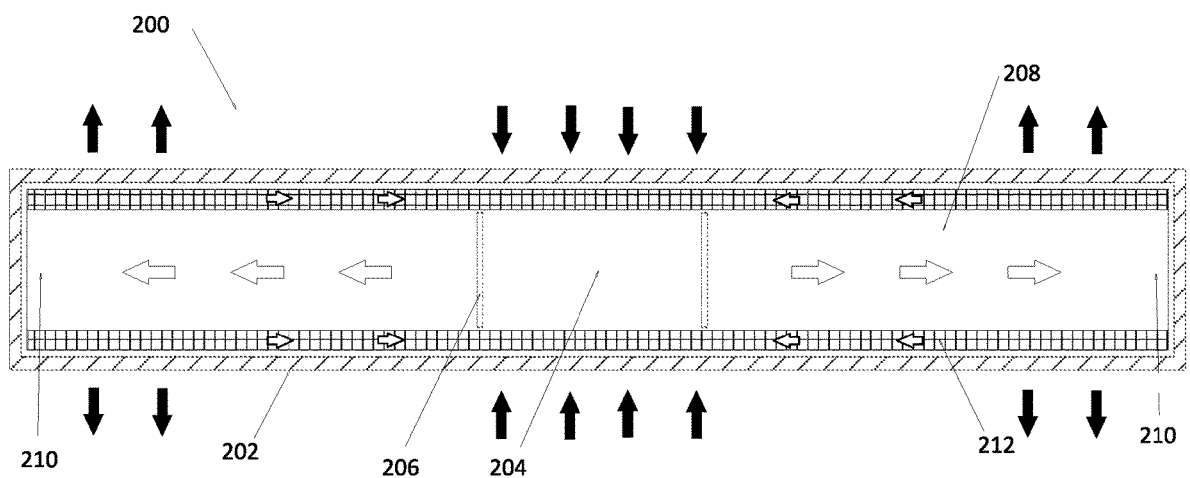
FIG. 2 illustrates a heat pipe within a reactor with dual condensers, according to an embodiment of the present invention.

FIG. 2 illustrates a heat pipe 202 within reactor 200 with dual condensers, according to an embodiment of the present invention. In some embodiments, heat pipe reactor 200 may include a heat pipe 202 with heat entering center 204 of heat pipe 202 from a reactor core. Evaporator exit zones 206, which enter into a decay or main heat exchanger in some embodiments, may be on both sides of center 204. This way, as heat enters center 204, the heat may be transferred out of heat pipe 202 using the heat exchangers. The location of heat exchangers along the heat pipe removal zones are not required to be symmetric, nor does the amount of heat transferred from the heat exchangers on the right have to equal to the amount of heat transferred from the heat exchangers on the left. The location where the heat exchangers are situated is arbitrary along the heat pipe condensers on either end of the heat pipe.

As vapor 208 travels through the core of heat pipe 202, condensation 212 may form in condenser region 210. Condensation 212 may then be returned along periphery of heat pipe 202 in the wick by capillary action.

By using this dual condenser configuration, overall power transferred to the energy converter/heat exchanger may be increased for the same overall reactor and condenser configuration. Also, the number of heat pipes required for the system may be decreased, and throughput from the reactor at a given temperature increases for the viscous, capillary, entrainment, and sonic limits. Only the boiling limit remains unaffected by the configuration change described herein.

Figure 3A:
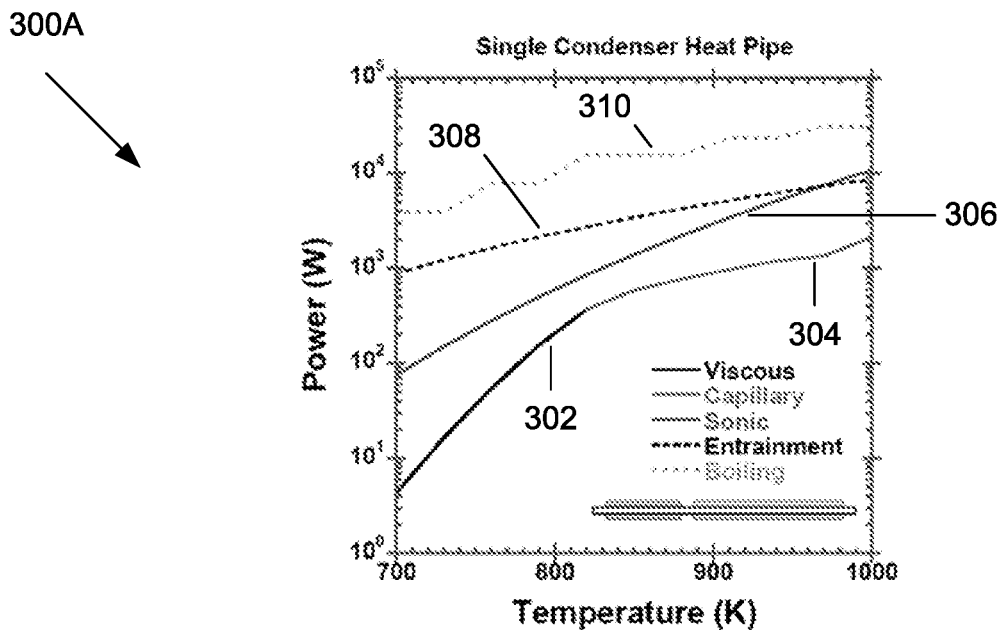
FIG. 3A shows a graph illustrating performance limit predictions versus evaporator exit temperature of a single condenser heat pipe similar to that shown in FIG. 1.
Figure 3B:
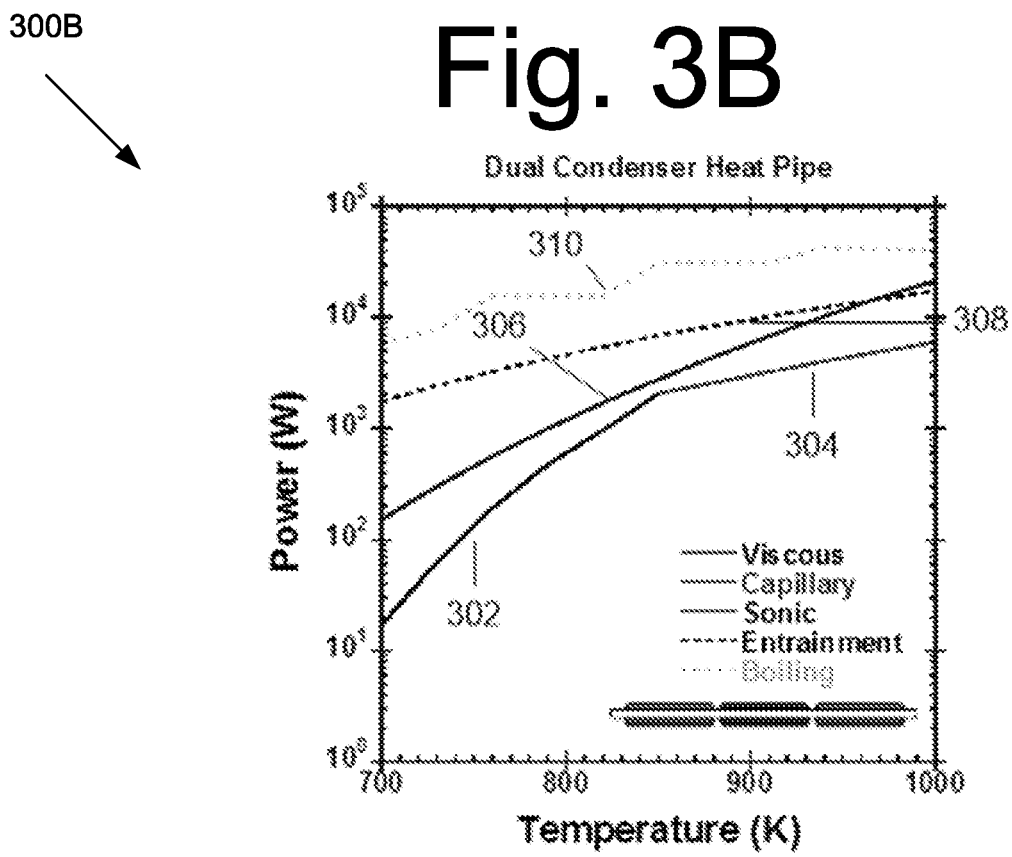
FIG. 3B shows a graph illustrating performance limit predictions for a dual condenser heat pipe similar to that shown in FIG. 2, according to an embodiment of the present invention.

It should be appreciated that placing heat pipe condensers on either side of the reactor core may address the following limits—(1) entrainment limit, (2) sonic limit, (3) capillary limit, and (4) viscous limit. See, for example, FIG. 3A, which shows a graph 300A for performance limit predictions of a single condenser heat pipe, and FIG. 3B, which shows a graph 300B for performance limit predictions for a dual condenser heat pipe both as a function of temperature at the heat pipe evaporator exits, according to an embodiment of the present invention.

Graphs 300A and 300B show that the viscous and capillary limits to heat transfer for the double ended condenser are up to four times that of a single ended heat pipe. Viscous limit 302 in some embodiments is defined as when the vapor pressure in the evaporator is insufficient to move vapor to the condenser end of the heat pipe. Only part of the heat pipe is isothermal in this condition. Capillary limit 304 in some embodiments is defined as when wick pumping is unable to return condensation to the evaporator region. Graphs 300A and 300B also show that sonic limit 306 and entrainment limit 308 are nearly doubled for the double condenser heat pipe. Sonic limit 306 in some embodiments is defined as when the vapor flow out of the evaporator reaches Mach 1 (choked). No further increases in vapor velocity are possible under these conditions. Entrainment limit 308 in some embodiments is defined as when the vapor velocity near the evaporator exit is sufficient to remove liquid from certain wick surfaces. This condition impedes condensation return to the evaporator limiting heat pipe heat transport capacity. Boiling limit 310 in some embodiments is defined as entirely unaltered by double ended operation.

By at least some of the embodiments herein, a heat pipe with condenser configuration on either side of the reactor enhances capillary and viscous limits by up to a factor of four and doubles the sonic and entrainment limits.

Figure 4:
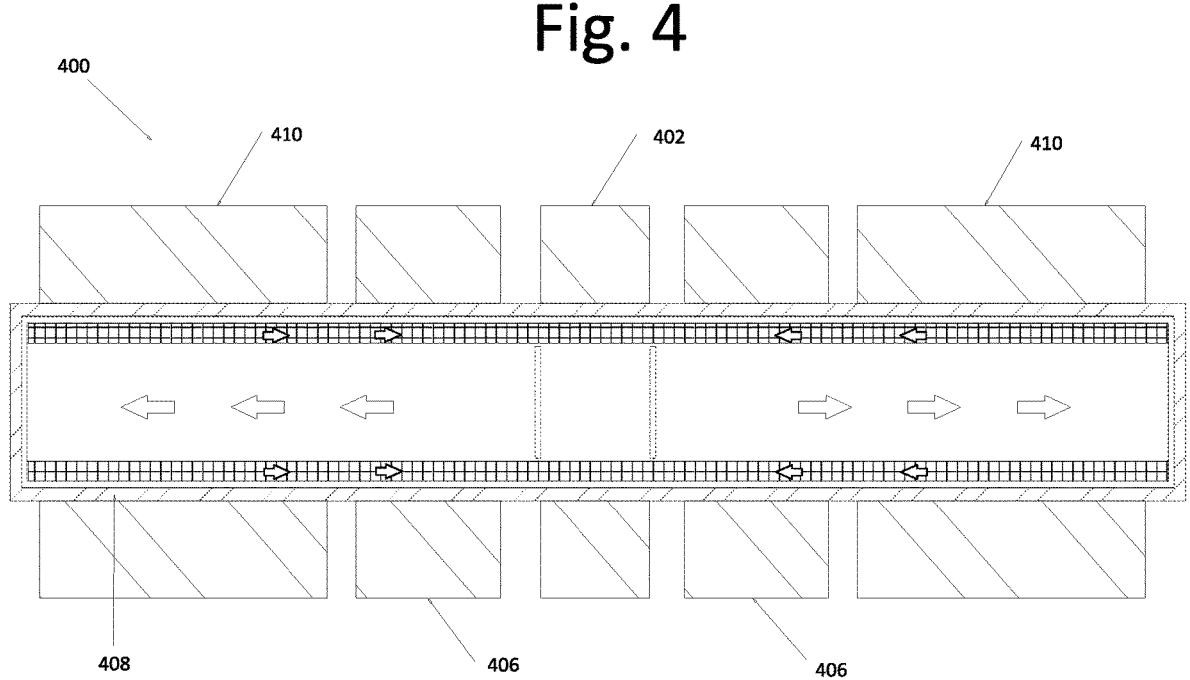
FIG. 4 is a block diagram illustrating a single heat pipe embedded in a reactor with two main heat exchangers in the dual ended configuration, according to an embodiment of the present invention.

FIG. 4 is a block diagram illustrating heat pipe reactor 400 with dual ended configurations, according to an embodiment of the present invention.

Heat from reactor 402 is applied to heat pipe 408, vaporizing working fluid within heat pipe 408. In some embodiments, the vapor may travel in either direction, e.g., left or right, and may condense near or at decay heat exchangers 406 and main heat exchangers 410. The amount of heat transferred to each heat exchanger 410, 406 may depend on each heat exchanger's coupling to its environment. This does not need to be the same for each heat exchanger. For example, the amount of heat transferred to the right may be different from the amount of heat transferred to the left. Also, heat exchanger 410, 406 may be different in length along heat pipe 408 and the number of heat exchangers need not be symmetric from left to right.

Heat pipe reactor 400 may include an active gas control feature in some embodiments. For example, non-condensable gas that is inert to the heat pipe working fluid such as helium, argon, etc., or in some cases gases, such as nitrogen, can be injected into one or both condenser ends of dual ended heat pipe 408. This may control the active length of heat pipe 408 and heat pipe 408 temperature during start, operation, and shutdown. Gas injection may be regulated by proportional or similar control of pressure or heat pipe temperature. The noncondensable gas may accumulate at the cold condenser ends of the heat pipe. Gas injection from both sides can be controlled individually or collectively. In certain embodiments, a partition may be placed at any point along the evaporator, creating two zones. The first zone may be hydraulically isolated for a flow in a first direction, and second zone may be hydraulically isolated for flow in a second direction.

Figure 5:
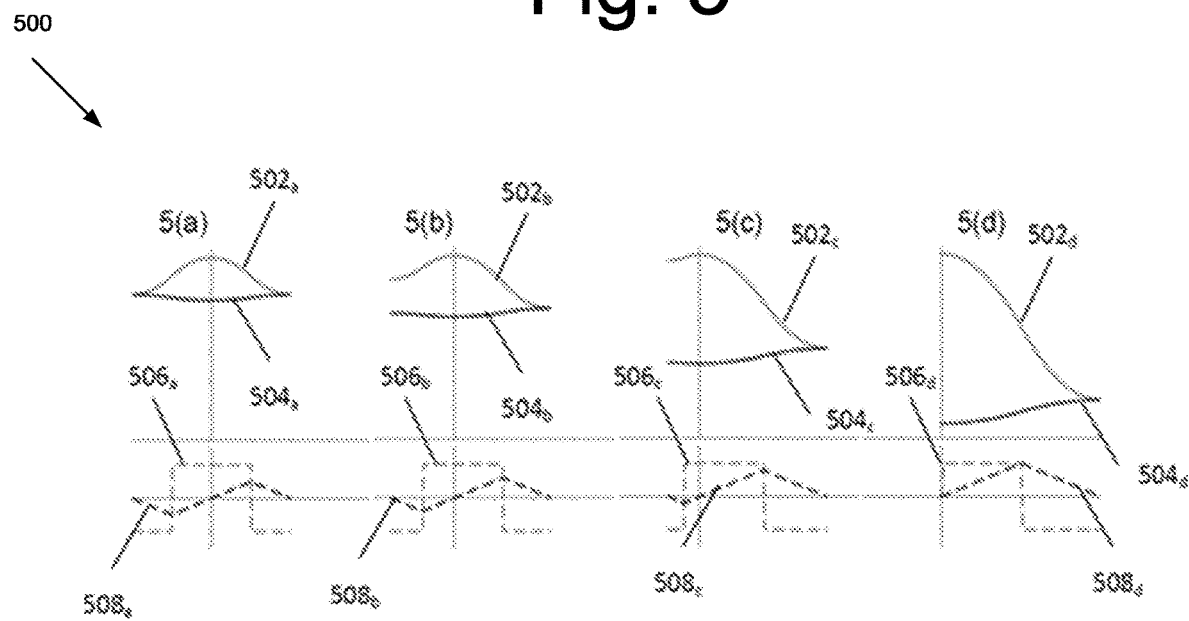
FIG. 5 are graphs illustrating power, vapor velocity, liquid pressure, and vapor pressure responses of fixed length heat pipe, according to embodiments of the present invention.

FIG. 5 shows graphs 5(a)-5(d) for a response of fixed length heat pipe, according to an embodiment of the present invention. Graphs 5(a)-5(d) show vapor pressure distribution $502_a$-$502_d$ and liquid pressure distribution $504_a$-$504_d$, and also show heating profile $506_a$-$506_d$ and vapor velocity $508_a$-$508_d$. Graph 5(a) in particular shows the case for symmetric heating, i.e., the same amount of heat that is going to the left is also going to the right. Graphs 5(b) and 5(c) shows vapor pressure distribution $502_b$, $502_c$ and liquid pressure distribution $504_b$, $504_c$ when the applied power is moved to the right. Graph 5(d) shows vapor pressure distribution $502_d$ and liquid pressure distribution $504_d$ when heat is applied on one side of a conventional heat pipe.

Figure 6:
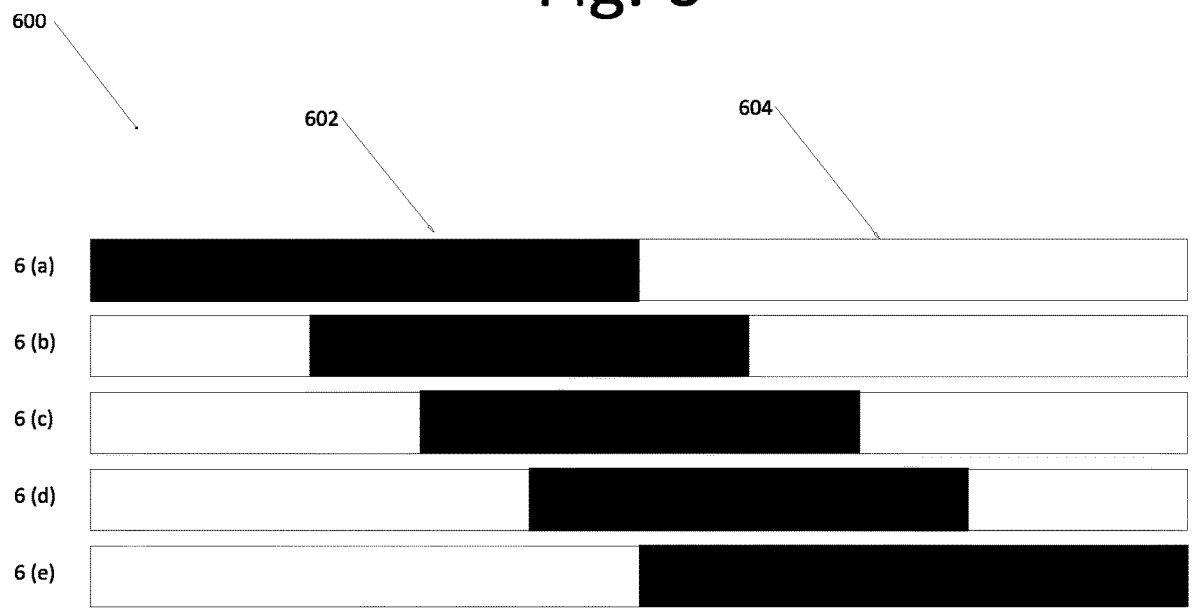
FIG. 6 illustrates various configurations of a heat pipe reactor, according to an embodiment of the present invention.

FIG. 6 illustrates various configurations of a heat pipe reactor 600, according to an embodiment of the present invention. In heat pipe configurations 6(a)-6(e), an evaporator 602 with a condenser 604 is shown. More specifically, configurations 6(a)-6(e) show different configurations of the heat pipe, ranging from a one-sided heat pipe (bottom) to a dual sided heat pipe (top), i.e., shows various placements of evaporator 602 with respect to condenser 604.

Consider a heat pipe at steady state with applied power per unit length q'(z) over domain, $0 \leq z \leq L$. For regions along the heat pipe where q'(z)>0, a hot reservoir supplies thermal power to the heat pipe. For regions where q'(z)=0, the heat pipe is adiabatic, and for regions where q'(z)<0, the heat pipe supplies thermal power to a cold reservoir. Regardless of the applied power condition, the total throughput for the heat pipe over the domain 0≤z≤L is $$q_T = \frac{1}{2}\int_0^L |q'(z)|dz \qquad \text{Equation (1)}$$

Equation (1) is general and applies to heat pipes with numerous evaporators and condensers over 0≤z≤L. The following treatment considers two restrictive cases: heat pipes with a single evaporator and dual condensers or heat pipes with a single condenser with dual evaporators. So long as the applied power per unit length is uniform over each region, analytical tractable relations can solve for pressure distribution for heat pipes in the incompressible limit. There exists an axial location $\xi_A$ over heat pipe length that partitions flow into counter rotating cells. This location satisfies:

$$\int_0^{\xi_A} q'(z)dz = 0 \qquad \text{Equation (2)}$$

It follows that if $\xi_A=0$ or $\xi_A=L$, then the heat pipe may only include a single evaporator and condenser. Throughputs for the counter rotating flow cells are, respectively:

$$q_1 = \frac{1}{2}\int_0^{\xi_A} |q'(z)|dz, \text{ and } q_2 = \frac{1}{2}\int_{\xi_A}^L |q'(z)|dz, \text{ so that, } q_T = \sum_{i=1}^2 q_i \qquad \text{Equation (3)}$$

Taking into account the change in heat pipe effective length, yields the variable:

$$\Xi_A = \frac{1}{2} - \left|\frac{\xi_A}{L} - \frac{1}{2}\right| \qquad \text{Equation (4)}$$

Accounting for the power transferred to either end of the heat pipe, yields the variable:

$$\Xi_B = 1 - \left|\frac{q_i}{q_T} - \frac{1}{2}\right| \qquad \text{Equation (5)}$$

For analytically tractable heat pipes at steady state in the laminar incompressible limit, the ratio of the dual condenser pressure drop to the single condenser pressure drop is then:

$$\frac{\Delta p_{v,2}}{\Delta p_{v,1}} = 1 - 2(\Xi_A\Xi_B) + (\Xi_A\Xi_B)^2 \qquad \text{Equation (6)}$$

Similar expressions may be derived for the liquid side pressure drop.

Table 1 (shown below) summarizes values for this relation as a function of $\xi_A$ and $q_i/q_T$. For example, when the vapor pressure drops with the wet point at the condenser end and with max($q_1,q_2$), and laminar incompressible flow then the following applies:

$$\Delta p_{v,2} = -\frac{f\text{Re}_{z,v}\mu_v}{2R_v^2 A_v \rho_v h_{fg}} q_T(0.5L_e + L_a + 0.5L_c)\left[1 - 2(\Xi_A\Xi_B) + (\Xi_A\Xi_B)^2\right] \qquad \text{Equation (7)}$$

TABLE 1

| | | Pressure ratios $\Delta p_{v,1}/\Delta p_{v,2}$ | | | | | | | | | | |
|---|---|---|---|---|---|---|---|---|---|---|---|---|
| | $\zeta_A$ | 0.0 | 0.1 | 0.2 | 0.3 | 0.4 | 0.5 | 0.6 | 0.7 | 0.8 | 0.9 | 1.0 |
| $q_i/q_T$ | $\Xi_B\backslash\Xi_A$ | 0.000 | 0.100 | 0.200 | 0.300 | 0.400 | 0.500 | 0.400 | 0.300 | 0.200 | 0.100 | 0.000 |
| 0.000 | 0.500 | 1.000 | 1.108 | 1.235 | 1.384 | 1.563 | 1.778 | 1.563 | 1.384 | 1.235 | 1.108 | 1.000 |
| 0.100 | 0.600 | 1.000 | 1.132 | 1.291 | 1.487 | 1.731 | 2.041 | 1.731 | 1.487 | 1.291 | 1.132 | 1.000 |
| 0.200 | 0.700 | 1.000 | 1.156 | 1.352 | 1.602 | 1.929 | 2.367 | 1.929 | 1.602 | 1.352 | 1.156 | 1.000 |
| 0.300 | 0.800 | 1.000 | 1.181 | 1.417 | 1.731 | 2.163 | 2.778 | 2.163 | 1.731 | 1.417 | 1.181 | 1.000 |
| 0.400 | 0.900 | 1.000 | 1.208 | 1.487 | 1.877 | 2.441 | 3.306 | 2.441 | 1.877 | 1.487 | 1.208 | 1.000 |
| 0.500 | 1.000 | 1.000 | 1.235 | 1.563 | 2.041 | 2.778 | 4.000 | 2.778 | 2.041 | 1.563 | 1.235 | 1.000 |
| 0.600 | 0.900 | 1.000 | 1.208 | 1.487 | 1.877 | 2.441 | 3.306 | 2.441 | 1.877 | 1.487 | 1.208 | 1.000 |
| 0.700 | 0.800 | 1.000 | 1.181 | 1.417 | 1.731 | 2.163 | 2.778 | 2.163 | 1.731 | 1.417 | 1.181 | 1.000 |
| 0.800 | 0.700 | 1.000 | 1.156 | 1.352 | 1.602 | 1.929 | 2.367 | 1.929 | 1.602 | 1.352 | 1.156 | 1.000 |
| 0.900 | 0.600 | 1.000 | 1.132 | 1.291 | 1.487 | 1.731 | 2.041 | 1.731 | 1.487 | 1.291 | 1.132 | 1.000 |
| 1.000 | 0.500 | 1.000 | 1.108 | 1.235 | 1.384 | 1.563 | 1.778 | 1.563 | 1.384 | 1.235 | 1.108 | 1.000 |

To summarize, Table 1 shows the vapor side pressure ratios if the evaporator is set at various locations along the length of the heat pipe, and various amounts of power are moved left side and right side the heat pipe.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A heat pipe reactor, comprising:
   a reactor core; and
   a heat pipe, wherein the heat pipe defines:
      a first end;
      a second end opposite the first end, wherein the first end and the second end of the heat pipe each comprise a condenser; and
      an evaporator region located between the first end and the second end of the heat pipe, wherein the evaporator region is non-centered along a length of the heat pipe between the first end and the second end and wherein the evaporator region of the heat pipe is positioned within the reactor core such that heat from the reactor core enters the evaporator region of the heat pipe during operation of the heat pipe reactor, and wherein the heat pipe contains a working fluid;
   a first heat exchanger disposed along a first length of the heat pipe proximate the first end of the heat pipe;
   a second heat exchanger disposed along a second length of the heat pie proximate the second end of the heat pipe, wherein the first and second heat exchangers are configured to allow the heat from the evaporator region to be transferred out of one or both ends of the heat pipe, and wherein an amount of heat transferred from the evaporator region to the first heat exchanger differs from an amount of heat transferred from the evaporator region to the second heat exchanger; and
   a third heat exchanger disposed along a third length of the heat pipe between the evaporator region and the first heat exchanger, the third heat exchanger positioned proximate the evaporator region and the third length shorter than the first and second lengths.

2. The heat pipe reactor of claim 1, wherein the condenser at the first end of the heat pipe is coupled to the first heat exchanger and wherein the condenser at the second end of the heat pipe is coupled to the second heat exchanger.

3. The heat pipe reactor of claim 2, wherein, in response to the heat entering the evaporator region of the heat pipe, the heat pipe reactor is configured to vaporize at least a portion of the working fluid in the heat pipe, and
   wherein at least a portion of the vaporized working fluid condenses at or near the condensers, allowing the heat from the evaporator region to be transferred to the first heat exchanger and the second heat exchanger.

4. The heat pipe reactor of claim 1, further comprising:
   a fourth heat exchanger disposed on the heat pipe between the evaporator region and the second heat exchanger, the fourth heat exchanger positioned proximate the evaporator region.

5. The heat pipe reactor of claim 1, wherein the heat pipe comprises a partition disposed in the evaporator region, wherein the partition defines a first zone and a second zone of the heat pipe, wherein the first zone is hydraulically isolated for a flow of a working fluid in a first direction, and wherein the second zone is hydraulically isolated for a flow of the working fluid in a second direction.

6. The heat pipe reactor of claim 1, wherein the working fluid comprises an alkali metal.

7. The heat pipe reactor of claim 6, wherein the working fluid comprises sodium, potassium, or lithium.

8. The heat pipe reactor of claim 1, wherein the heat pipe further comprises a non-condensable gas, the non-condensable gas comprising helium, argon, or nitrogen.

* * * * *